June 27, 1967   E. F. HOLDEN   3,327,686
FLOATING ISLAND SANCTUARY FOR AQUARIUMS
Filed Oct. 20, 1965

INVENTOR.
EDWARD F. HOLDEN
BY Olsen and Stephenson
ATTORNEYS

United States Patent Office 3,327,686
Patented June 27, 1967

3,327,686
FLOATING ISLAND SANCTUARY FOR AQUARIUMS
Edward F. Holden, 602 Eberwhite Blvd., Ann Arbor, Mich. 48103
Filed Oct. 20, 1965, Ser. No. 498,484
5 Claims. (Cl. 119—5)

This invention relates generally to aquariums and more particularly to an aquarium accessory in the form of a floating island which can be used as a sanctuary by small fish.

One of the problems inherent in all home aquariums is the problem of placing large and small fish in the same aquarium. Most aquarists are desirous of keeping both large and small fish but the small fish are often not safe in the presence of the larger fish. Another problem faced by home aquarists is the problem of providing a natural setting appearance to the aquarium so as to improve the visual appeal of the background against which the captive fish are observed. From an aesthetic standpoint, it is desirable to improve the normal unnatural appearance of the aquarium. It is an object of this invention, therefore, to provide a shaped and decorated body that resembles an island which is floated on the water surface of an aquarium, is provided with an interior pond connected to the aquarium proper by means of small streams so that small fish can continuously find refuge from the larger fish in the island pond, and which imparts a natural scene having aesthetic appeal to the overall appearance of the aquarium.

Another object of this invention is to provide a floating island sanctuary for aquariums which can be readily formed from sheet or similar plastic material, includes ballast carrying cavities which impart stability to the island which can thus be floated at various levels to adjust the level of a pond and streams in the island.

Further objects, features and advantages of this invention will become apparent from a consideration of the following description, the appended claims, and the accompanying drawing in which:

Figure 1:
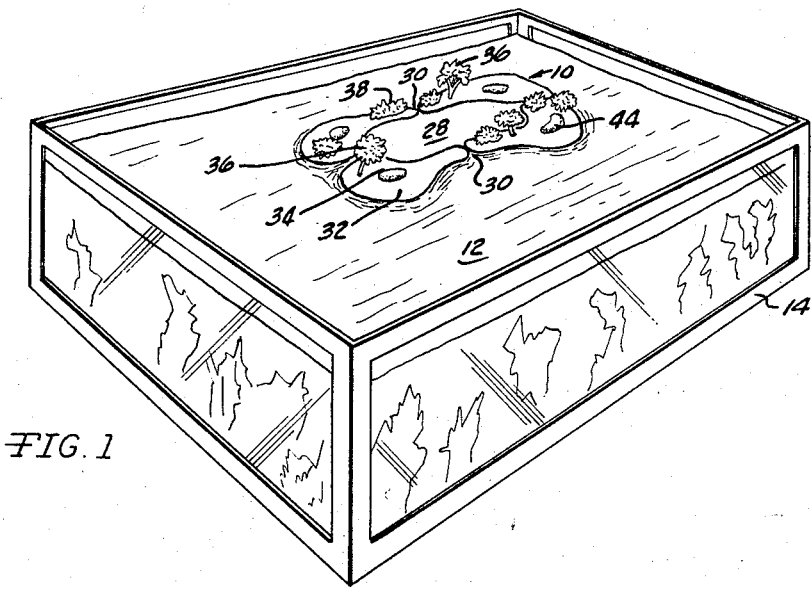
FIGURE 1 is a perspective view of the floating island sanctuary of this invention, showing the sanctuary floating on the water surface in a conventional home aquarium.
Figure 2:
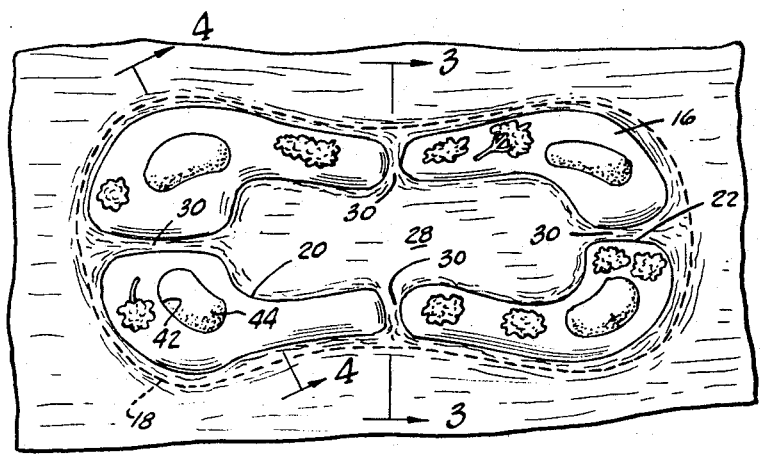
FIGURE 2 is a fragmentary top view of the sanctuary and water surface shown in FIG. 1.

With reference to the drawing, the floating island sanctuary of this invention, indicated generally at 10, is shown in FIG. 1 floating on the water surface 12 in a conventional home aquarium 14. The sanctuary 10 consists of a unitary relatively thin walled form retaining body 16 which is shaped and decorated to resemble as island. The body 16 has an irregularly shaped outer edge 18 which is normally submerged below the water surface 12, and inwardly of its outer edge 18, the body 16 is formed with a depression 20. Extending between the depression 20 and the outer edge 18 are a plurality of narrow and shallow channels 22. In the illustrated embodiment of the invention, four such channels 22 are utilized. The channels 22 have bottom walls 24 which are located below the water surface 12 and above the bottom wall 26 of the depression 20. Consequently, water from the aquarium 14 is continuously maintained in the depression 20 and the channels 22 at a level corresponding to the level of the water surface 12 in the aquarium 14. The water in the depression 20 thus forms an interior pond or lake 28 in the sanctuary 10 which communicates with the water in the aquarium 14 by way of the water in the channels 22, which water gives the appearance of streams 30 continuously communicating with the pond 28. Since the bottom wall 26 of pond 28 is below the level of channels 22 water will continuously flow through channels 22 to pond 28 to replenish water evaporated from the pond 28.

The body 16 is preferably formed from a thin sheet of a suitable plastic material of sufficient thickness and rigidity that it maintains itself in a form retaining shape similar to the shape illustrated in the drawing. A suitable method for making body 16 involves heating the plastic sheet to the point where it is somewhat flexible and pliable, forcing the pliable sheet onto a mold or form, and removing and cooling the sheet in the usual manner. A desired tropical or other island appearance can be imparted to the shaped body 16 by brushing or spraying differently colored materials on pre-selected areas or portions of the body 16 to thus form an integral coating on the body 16. Such painting can be applied either before or after contour forming of the body 16 to give the island 10 the appearance of, for example, having a sandy beach 32 which communicates with higher ground 34. If desired, decals may be applied to the body 16 to enhance the appearance, miniature trees 36 and shrubbery 38 can be mounted on the body 16, and miniature models of buildings, people, boats, etc. (not shown) can also be utilized to impart the overall desired natural appearance to the sanctuary 10.

Figure 4:
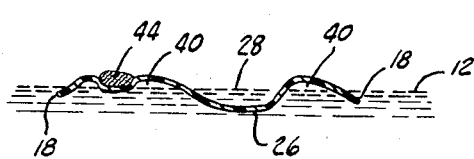
FIGURE 4 is a sectional view of the sanctuary of this invention as seen substantially from the line 4—4 of FIG. 2.
Figure 3:
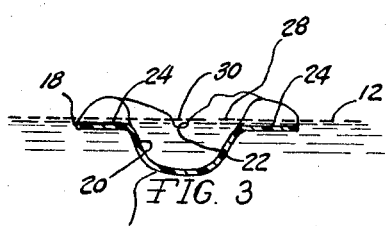
FIGURE 3 is a transverse sectional view of the sanctuary of this invention looking substantially along the line 3—3 of FIG. 2.

The contour forming of the body 16 provides for the formation of entrapped air pockets, like the ones shown in FIG. 4, between portions of the body 16 and the water surface 12 when the sanctuary 10 is floated on the water surface 12. These air pockets 40 impart buoyancy to the body 16 so as to maintain it afloat in the aquarium 14. The body 16 is also formed with a plurality of cavities or recesses 42 in which suitable ballast 44, such as sand, rocks, or other high density material is positioned, to impart stability to the floating sanctuary 10. The amount of ballast 44 which is utilized also determines the depth at which the sanctuary 10 floats in the aquarium 14. This depth in turn regulates the depth of the streams 30 through which fish must enter the interior pond 28. Consequently, the amount of ballast 44 in the recesses 42 can be utilized to regulate the size of the fish which can reach the pond 28 and thus obtain refuge in the pond 28. By thus adjusting the ballast 44, the home aquarist can exclude the fish from the pond 28 which would be damaging to the smaller fish in the aquarium 14.

The floating sanctuary 10 can be of any desired size and can be of a size to cover the entire water surface in the event an aerator (not shown) is in use in the aquarium 14. Where no aerator is used, the sanctuary 10 should be of such a size as to preclude the possibility of reducing the water surface area to an extent such that the normal oxygen supply to the aquarium water would be adversely affected.

From the above description, it is seen that this invention provides a three dimensional aquarium accessory 10 which is capable of being floated on the water surface 12 in an aquarium 14 to improve the appearance of the aquarium 14 from an aesthetic standpoint, and also to provide a sanctuary for small fish in the aquarium 14 which would otherwise be subject to continual attack from the larger fish. The streams 30 formed in the sanctuary 10 provide for a continual communication of the interior pond 28 and the aquarium water proper. Consequently, smaller fish can at all times find refuge in the pond 28.

It will be understood that the floating island sanctuary for aquariums which is herein disclosed and described is presented for purposes of explanation and illustration and is not intended to indicate limits of the invention, the scope of which is defined by the following claims.

What is claimed is:

1. A three dimensional aquarium accessory adapted to be floated on the water surface in an aquarium comprising a unitary relatively thin walled form retaining floatable body shaped and decorated to resemble an island, said body having an outer edge and an interior depression spaced from said edge, said body being formed with at least one substantially horizontal channel extending between said interior depression and said water surface so that when said body is floated on said surface said interior depression and said channel will be in continuous communication with said surface to thereby form an interior pond in said island provided with a water containing inlet and outlet channel, said channel being of a size such that small fish can travel therethrough and said depression being of a size to accommodate several fish entering through said channel.

2. A three dimensional aquarium accessory adapted to be floated on the water surface in an aquarium comprising a unitary relatively thin walled form retaining floatable body shaped and decorated to resemble an island, said body having an outer edge adapted to be submerged below said water surface and an interior depression spaced from said edge, said body being formed with at least one relatively shallow and narrow substantially horizontal channel extending between said interior depression and said outer edge so that when said body is floated on said surface said interior depression and said channel will be in continuous communication with said surface at said edge to thereby form an interior pond in said island provided with a narrow and shallow inlet and outlet channel, said channel being of a size such that small fish can travel therethrough and said depression being of a size to accommodate several fish entering through said channel.

3. A three dimensional aquarium accessory adapted to be floated on the water surface in an aquarium comprising a unitary relatively thin walled form retaining floatable body shaped and decorated to resemble an island, said body having an outer edge adapted to be submerged below said water surface and an interior depression spaced from said edge, said body being formed with a plurality of substantially horizontal channels extending between said interior depression and said outer edge so that when said body is floated on said surface said interior depression and said channels will be in continuous communication with said surface at said edge to thereby form an interior pond in said island provided with channels connecting said interior pond and the aquarium water surface, said channels each being of a size such that small fish can travel therethrough and said depression being of a size to accommodate several fish entering through said channels, and means in said body providing recesses for ballast.

4. In an aquarium containing water, a body shaped and decorated to resemble an island and floating on said water, said body having portions spaced above the surface of said water so as to entrap air between said body and said surface to provide buoyancy for said body, said body having a water containing depression formed therein and being provided with at least one substantially horizontal channel which extends between said depression and said aquarium water so as to provide said island with an inland pond which is in continuous communication through said channel with said aquarium water, said channel being of a size such that small fish can travel therethrough and said depression being of a size to accommodate several fish entering through said channel.

5. In an aquarium containing water, a three dimensional accessory comprising a unitary relatively thin-walled form retaining body floating on said water, said body having a water containing depression formed therein and being provided with a plurality of substantially horizontal channels which extend between said depression and said aquarium water so as to provide said body with an inland pond which is in continuous communication through said channels with said aquarium water, said channels each being of a size such that small fish can travel therethrough and said depression being of a size to accommodate several fish entering through said channels.

References Cited
UNITED STATES PATENTS

| | | | |
|---|---|---|---|
| 848,101 | 3/1907 | Hale | 119—3 X |
| 2,711,714 | 6/1955 | Timeus | 119—5 |
| 3,095,852 | 7/1963 | Goldman | 119—3 |
| 3,141,442 | 7/1964 | Harris | 119—5 |

SAMUEL KOREN, *Primary Examiner.*

HUGH R. CHAMBLEE, *Examiner.*